(12) United States Patent
Shetrit et al.

(10) Patent No.: US 7,747,122 B2
(45) Date of Patent: Jun. 29, 2010

(54) METHOD AND APPARATUS FOR HIGH SPEED SILICON OPTICAL MODULATION USING PN DIODE

(75) Inventors: Yoel Shetrit, Mevaseret (IL); Ling Liao, Santa Clara, CA (US); Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 12/242,454

(22) Filed: Sep. 30, 2008

(65) Prior Publication Data

US 2010/0080504 A1    Apr. 1, 2010

(51) Int. Cl.
*G02B 6/10* (2006.01)
*G02F 1/01* (2006.01)
(52) U.S. Cl. ........................................ 385/130; 359/279
(58) Field of Classification Search ................. 385/130; 359/279
See application file for complete search history.

(56) References Cited

U.S. PATENT DOCUMENTS

| | | |
|---|---|---|
| 7,280,712 B2 | 10/2007 | Liu |
| 2004/0264828 A1 | 12/2004 | Liu |
| 2005/0175305 A1 | 8/2005 | Liu |
| 2006/0126986 A1 | 6/2006 | Liu |
| 2007/0031080 A1 | 2/2007 | Liu |
| 2007/0280309 A1 | 12/2007 | Liu |

OTHER PUBLICATIONS

U.S. Appl. No. 11/823,659, filed Jun. 28, 2007, Liu.

*Primary Examiner*—Jerry T Rahll
(74) *Attorney, Agent, or Firm*—Blakely, Sokoloff, Taylor & Zafman LLP

(57) ABSTRACT

A method and apparatus for high speed silicon optical modulation is described using a PN diode. In one example, an optical waveguide has adjoining first and second doped semiconductor regions. The first and second regions have opposite doping types and the first doped region extends in two perpendicular directions through the waveguide.

18 Claims, 3 Drawing Sheets

METHOD AND APPARATUS FOR HIGH SPEED SILICON OPTICAL MODULATION USING PN DIODE

BACKGROUND

1. Field of the Invention

The present invention relates generally to optics and, more specifically, the present invention relates to silicon optical modulators.

2. Background Information

Internet and network data traffic growth pushes toward optical-based data communication. Transmission of multiple optical channels over the same fiber in dense wavelength-division multiplexing (DWDM) systems and Gigabit Ethernet (GBE) systems provides a simple way to use the higher data capacity (signal bandwidth) offered by fiber optics. Commonly used optical components in data communications systems include wavelength division multiplexed (WDM) transmitters and receivers, optical filters such as diffraction gratings, thin-film filters, fiber Bragg gratings, arrayed-waveguide gratings, optical add/drop multiplexers, modulators, lasers and optical switches.

Many of these building block optical components can be implemented in semiconductor devices. In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$). III-V semiconductor compounds such as InP and GaAs have also been used for high-speed modulators.

Silicon photonic integrated circuits offer low cost optoelectronic solutions for applications ranging from telecommunications to chip-to-chip interconnects. An optical modulator is a key component of any optical communications link, however, it is challenging to achieve high speed optical modulation in silicon. Currently, the free carrier plasma dispersion effect is favored for high speed optical modulation in silicon. In this approach, a change in free carrier density in a silicon waveguide results in a change in the refractive index of the material. The refractive index change modifies the optical phase of light passing through it. The speed at which this modulation can be done is limited in part by how fast the free carriers can be injected into or removed from the waveguide, the region occupied by the traveling optical mode.

BRIEF DESCRIPTION OF THE DRAWINGS

The present invention is illustrated by way of example and not limitation in the accompanying figures.

DETAILED DESCRIPTION

In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale. Furthermore, it is also appreciated that the specific dimensions, index values, materials, etc. illustrated herewith are provided for explanation purposes and that other suitable dimensions, index values, materials, etc., may also be utilized in accordance with the teachings of the present invention.

In one embodiment of the present invention, optical signals can be modulated at high speed using reverse-biased pn diodes as an optical waveguide. With either horizontal or vertical pn junctions there is a relatively weak overlap or interaction between the charge carriers and the optical mode of the light passing through the waveguide. This reduces the phase efficiency, frequently to no better than 3 V.cm for light at wavelengths of around 1.55 µm. The efficiency of these designs can be increased by placing the pn junction inside the waveguide with precise position control. However, such a precision requirement makes the modulator difficult to manufacture.

In one embodiment of the present invention, by changing the shape of the pn diode, the efficiency can be improved without requiring precise position control. A Z-shaped pn diode design, for example, is more efficient in that it can provide charge carrier depletion in both the horizontal and vertical directions. In this case, the total depletion area change with drive voltage is larger than that for either a horizontal or a vertical junction only. The phase modulation efficiency of about 1.6 V.cm for 1.3 µm light can be achieved without difficulty. The configuration described below may be fabricated using a low energy angled implant without strict requirements on the lithography registration control.

Figure 1:
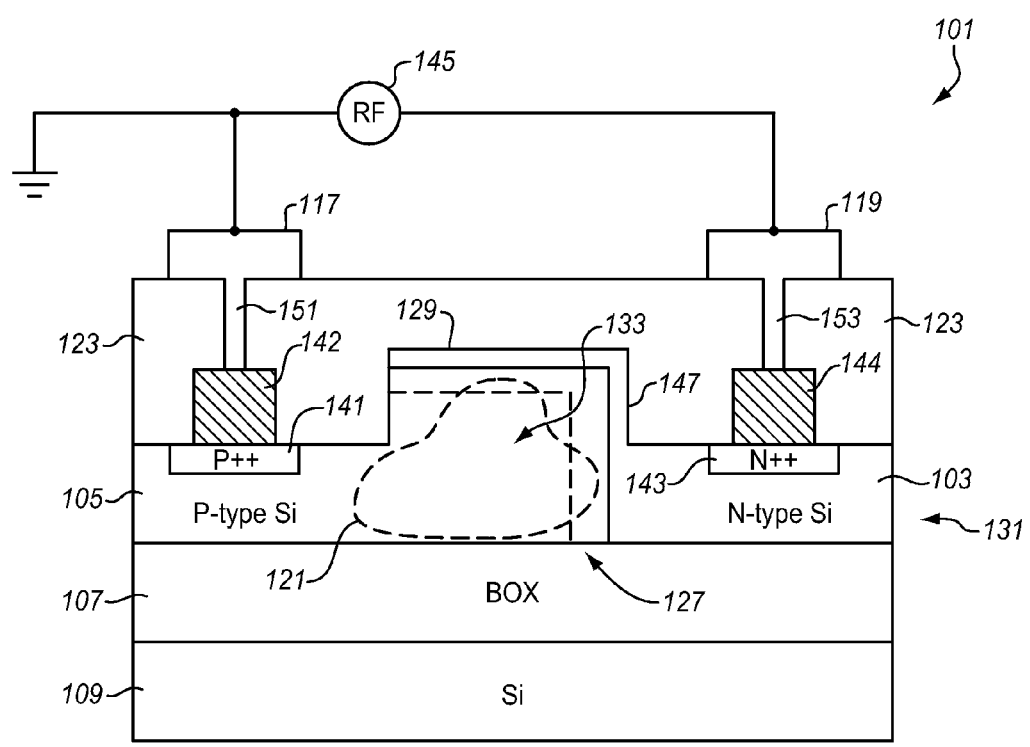
FIG. 1 is a cross-sectional view diagram of one embodiment of a phase modulator in accordance with the teachings of the present invention.

FIG. 1 shows a cross-sectional diagram of a high speed optical modulator 101 on a silicon-on-insulator (SOI) substrate. The substrate has a silicon layer 109, covered by a buried oxide (BOX) layer 107, although a variety of other layers may be used instead. The modulator uses a Z-shaped pn diode design 103, 105 deposited over the BOX layer 107, where a pn junction 147 is near the edge of an optical waveguide 127. Referring to the n-doped silicon region 103 in FIG. 1, it has a shape that resembles the letter Z with the top portion at the left running across the top of the central ridge 129, the middle portion of the Z runs down along the right side of the central ridge, and the bottom stand of the Z extends horizontally from the central ridge and off to the right.

The pn diode has two metal contacts 117, 119 for external connections. One metal contact 117, on the left side of the pn diode as shown in FIG. 1, is coupled to a highly p doped (p++) region 141 through a metal pad 142 that is connected to the contact through a via 151. The other metal contact 119, on the right side of the pn diode as shown in FIG. 1, is coupled to a highly n doped (n++) region 143 through a metal pad 144 that is connected to the contact through via 153. The highly doped regions 141, 143 are embedded into the pn diode 105, 103. The left side highly doped p++ region is embedded into a p-type region 105 of the diode and the right side highly doped n++ region is embedded into an n-type region 103 of the diode.

Approximately centered between the two regions is the waveguide 127 which includes a central ridge. The central ridge extends upwards vertically away from the BOX layer. The pn diode is formed in order to fill this central ridge as well as the horizontal layer below the ridge and below the vias on either side of the central ridge. Instead of providing, for example a p-type horizontal layer, with an n-type ridge, in the example of FIG. 1, the p-type regions extends from a p++ region across the central ridge horizontally and also vertically up into the central ridge. The n-type part of the pn diode fills the region from the n++ region horizontally across to the p-type region.

As shown in the example of FIG. 1, the n-type area also occupies the periphery of the central ridge, although this is not necessary to the present invention. This configuration may be formed by first performing the p-doping and then creating the n-doping area around the periphery of the waveguide and in the n-doped region on the right side. Alternatively, the n-doping region may be formed first and then a p-doping area around the periphery of the waveguide is then created. In the illustrated example, the transition has a horizontal or lateral extent or travel near the top of the central ridge of the waveguide and a vertical extent or travel along the right side of the central ridge. In other words, the optical beam experiences the pn junction on two perpendicular sides. As a result, the pn junction, by extending horizontally and vertically, fills a greater portion of the waveguide than with many other designs.

The waveguide of FIG. 1 may be constructed with a 0.4 μm width, a 0.4 μm height, and a 0.15 μm slab. Although the particular dimensions may be adapted to suit the particular circumstances.

Considering FIG. 1 in more detail, the optical waveguide 127 has a depletion region 133 at the pn junction interface 147, which extends both horizontally and vertically. The depletion width in a pn junction depends on both the doping density profiles and applied external voltage. The depletion width increases when an external drive voltage is applied. Thus, the charge density in the waveguide containing a pn junction is varied according to the radio frequency (RF) source 145 applied to the pn junction in accordance with the teachings of the present invention. For one example, there are substantially no free charge carriers in the depletion region 133, while there are free charge carriers outside of the depletion region 133 due to the n-type and p-type doping.

As shown in the illustrated example, the optical device 101 includes an optical waveguide 127 including adjoining regions 103 and 105 of semiconductor material having opposite doping types. In the illustrated example, the optical waveguide 127 is shown as a rib waveguide including a rib region 129 and a slab region 131. As can be seen in the illustrated example, the intensity of a propagating optical mode 121 of an optical beam through the optical waveguide 127 is vanishingly small at the "upper corners" of the rib region 129 as well as at the "sides" of the slab region 131 of optical waveguide 127. The optical beam is shown propagating "into the page" through the optical waveguide 127. In other examples, it is appreciated that other types of suitable waveguides may be employed.

In one example, the semiconductor material includes silicon (Si). For example, region 103 may include n type silicon and region 105 may include p type silicon such that the free charge carriers in the n type silicon outside of the depletion region 133 are electrons and the free charge carriers in the p type silicon outside of the depletion region 133 are holes. In other examples, the semiconductor material may include other suitable types of semiconductor material such as for example germanium (Ge), Si/Ge, or the like. In one example, regions 103 and 105 have doping concentrations such that the pn junction interface 147 between regions 103 and 105 is reverse biased due to the built-in electrical field. In another example, the polarities of the dopings (n and p) of regions 103 and 105 may be reversed in accordance with the teachings of the present invention.

As mentioned above, the optical device 101 may be formed on a silicon-on-insulator (SOI) wafer and therefore includes a buried oxide layer 107 disposed between another semiconductor layer 109 and the semiconductor material of the doped regions 103, 105. As shown, optical device 101 also includes a buffer layer insulating material 123 above the doped regions which also serves as cladding material for the optical waveguide 127. The higher doped regions, 141 and 143, are outside the optical path of the optical mode 121 through the optical waveguide 127. With the higher doped regions 141 and 143 disposed outside the optical path of the optical mode 121 through the optical waveguide 127, optical loss is reduced. The higher doped regions 141 and 143 have higher doping concentrations than the doping concentrations of regions 103 and 105 within the optical path of the optical mode 121 along optical waveguide 127.

As shown, the higher doped regions 141 and 143 are symmetrically adjoining and coupled to respective opposite lateral sides of the pn diode regions 103, 105. The optical device 101 also includes contact pads 117 and 119, which are coupled to higher doped regions 141 and 143, respectively, through the buffer layer insulating material 123 through vias 151 and 153, respectively. As shown, contacts 117 and 119 are also located outside the optical path of the optical mode 121 through optical waveguide 127. For one example, contacts 117 and 119 include metal with high electrical conductivity and low resistance. In one example, contacts 117 and 119 are combined and connected with a metal electrode designed for high frequency traveling wave signal transmission in accordance with the teachings of the present invention.

As shown in the illustrated example, one end of contact 119 at one end of the waveguide is coupled to receive a traveling wave signal from an RF source 145. Another end of contact 119 at the other end of the waveguide (not shown) is terminated with a load impedance or termination load coupled to a reference voltage such as ground. In addition, contact 117 is coupled to a reference voltage such as ground. As a result, the bias of the pn junction or interface 147 between regions 105 and 103 is adjusted with the application of the external drive voltage through the traveling wave signal 155 and through the higher doped regions 141 and 143. The higher doping concentrations of the higher doped regions 141, 143 help improve the electrical coupling of the coplanar contacts 117, 119 to the semiconductor material regions 105, 103 in accordance with the teachings of the present invention. In another example, a RF signal may be applied between contacts 117 and 119. In this case, the pn junction acts as a capacitor in series with a source resistor from the RF source.

The improved electrical coupling reduces the contact resistance between the metal contact pads 117, 119 and the semiconductor material regions 105, 103, which reduces the RF attenuation of the traveling wave signal 155. The reduced contact resistance improves the electrical performance of the optical device 101 in accordance with the teachings of the present invention. The reduced RF attenuation and good optical electrical wave velocity matching enable faster switching times and device speed.

In the illustrated example, the traveling wave signal 155 is applied to one end of contact 119 by the RF source 145 to adjust the size or thickness of the depletion region 133 at the pn junction interface 147 between the n and p doped regions 103, 105 of the optical waveguide 127 in accordance with the teachings of the present invention. As shown, the depletion region 133 overlaps with the optical mode 121 of the optical beam propagating through the optical waveguide 127. Both the optical wave and RF microwaves co-propagate along the waveguide. When the RF phase velocity matches the optical group velocity, the optical beam experiences a phase shift responding to the applied electrical field. The device speed is therefore not limited by the RC time constant as in some other devices.

The respective widths, heights, and relative positions of the higher doped regions 141, 143 coupled to contacts 117 and 119 may be selected to obtain the velocity matching. For example, RF phase velocity is generally determined by the device inductance and capacitance. By varying the metal contact geometry and semiconductor as well as dielectric layer thickness, the inductance and capacitance values can be changed, and in turn, the RF phase velocity can be matched with optical group velocity. This is called "real" phase velocity matching. In another example the phase velocities may be "artificially" matched by, for example, utilizing a phase reversed electrode design. In addition, doping distribution and metal electrode may be designed to obtain a small RF attenuation. For instance, less than 6 dB is enough to obtain the benefit of using a traveling wave drive scheme.

When there is no external drive voltage or when the external drive voltage from the traveling wave signal 155 is substantially zero, the depletion region 133 at the pn junction interface 147 between the regions 103, 105 of the optical waveguide 127 is a result of the built-in electrical field caused by the doping concentrations of the doped regions 103, 105. However, when a non-zero external drive voltage is applied via the traveling wave signal 155, the reverse bias at the pn junction interface 147 between the doped regions 103, 105 of the optical waveguide 127 is increased, which results in the corresponding depletion region 133 being substantially larger or thicker in accordance with the teachings of the present invention.

A carrier density change may be used for optical modulation by operating the pn diode in reverse bias. Reverse bias corresponds to carrier depletion mode. Carrier depletion may provide benefits in certain circumstances over carrier injection (as in forward bias). Carrier depletion is inherently faster and not limited by the generally slow carrier dynamics of injection.

In the example of FIG. 1, the p-type Si may be designed to have a lower doping concentration than the n-type Si. Accordingly, most of the depletion width change occurs inside the p-type material, near the center of the waveguide. As shown in FIG. 1, the p-type Si fills most of the center of the waveguide. A better mode overlap with p-type Si depletion typically increases the amount of change in the refractive index. This occurs because hole depletion, which occurs in the p-type material, results in a larger refractive index change than electron depletion. Accordingly, the amount of overlap can be adapted to achieve the desired effect.

The Z-shaped pn junction design simultaneously depletes the Si (hole depletion) in both the vertical and horizontal directions. This enhances the optical mode-to-charge interaction improving phase modulation efficiency. Such a device may have efficiency of 1.6 V/cm at a 1.3 µm wavelength and an optical loss of less than 3 dB for a 6 dB modulation depth. The intrinsic modulation bandwidth of this device, which is determined by its carrier dynamics may be in excess of 10 GHz.

Figure 2A:
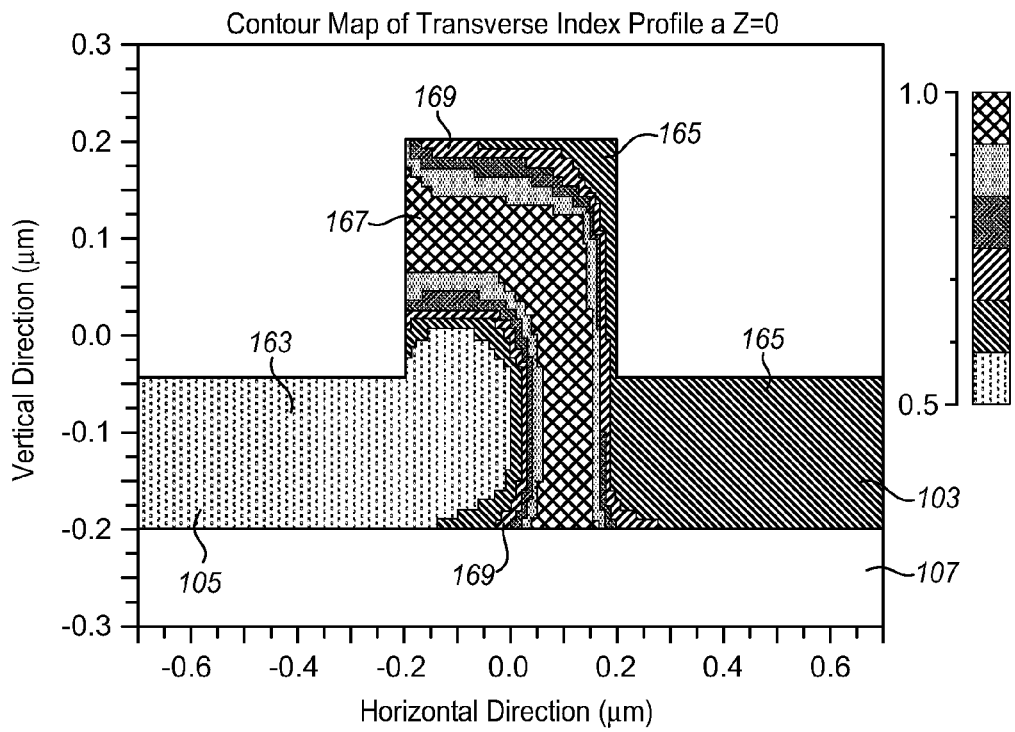
FIG. 2A is a diagram of a contour plot of index of refraction at applied 0V in the phase modulator of FIG. 1 in accordance with the teaching of the present invention.
Figure 2B:
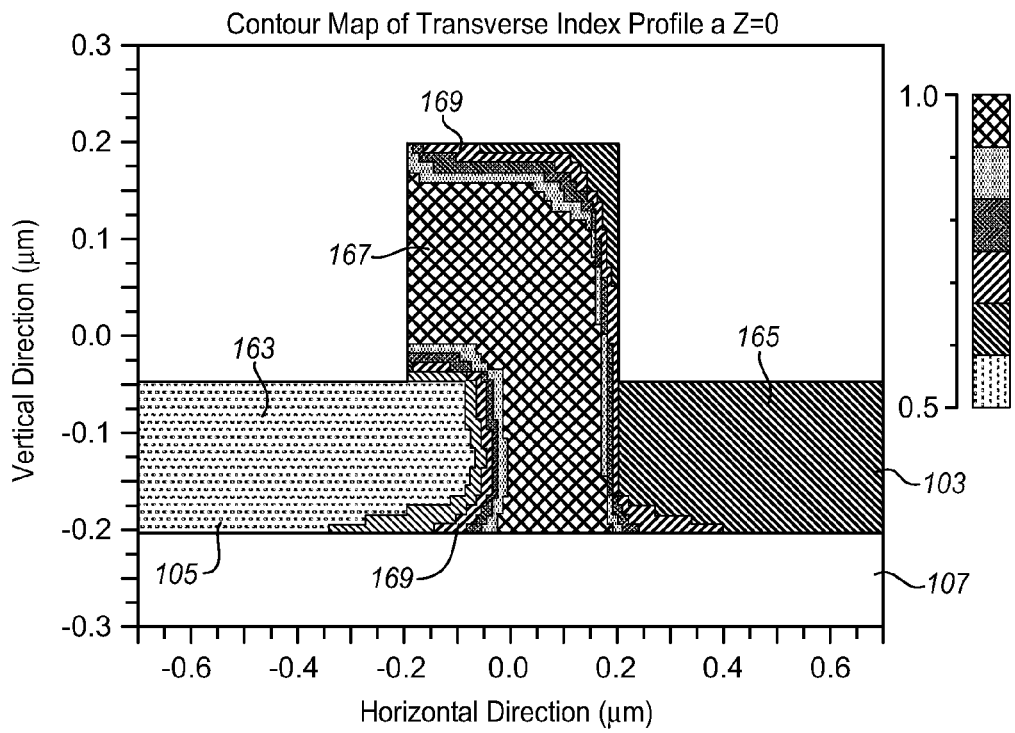
FIG. 2B is a diagram of a contour plot of index of refraction at applied 0.9V in the phase modulator of FIG. 1 in accordance with the teaching of the present invention.

FIGS. 2A and 2B are diagrams of contour plots produced by modeling the refractive index of the pn diode of FIG. 1 in response to applied voltage across the two contacts 117, 119. FIG. 2A shows the resulting contours from applying 0 V and FIG. 2A show the same diode with a 0.9 V reverse bias applied. In both FIG. 2A and FIG. 2B, the p-doped region 105 has a very low index of refraction near the left metal contact 142 and extending horizontally to the waveguide. Similarly the n-doped region 103 has a low index of refraction 165 near the right metal contact and extending horizontally to the waveguide. Both low index areas extend into the waveguide, with the low index area of the n-doped area extending up into the central ridge and around the p-doped region.

At the center of the waveguide, is a high index of refraction area 167, approximately. The index of refraction quickly falls off as shown by the intermediate index areas 169. With the voltage applied, the holes are quickly depleted and as can be seen by comparing FIGS. 2A and 2B, the high index area grows significantly, pushing the low and very low index areas 163, 165 out of the waveguide and reducing the size of the intermediate index areas 169. As shown, the change in carrier concentration is primarily at the center of the optical mode 127 traveling through the waveguide.

The contour plots of FIGS. 2A and 2B do not show actual values for the index of refraction. Instead, the possible range of indices has been normalized to a scale from 0 to 1. This shows that depleting the charges increases the index. As can be seen in the drawing figures the contour plot for 0.9 V, compared to that for 0V, shows a larger region of the waveguide having a higher index of refraction due to charge depletion. Most of this change is near the waveguide center.

The transient response of the modulator of FIG. 1 can also be modeled. The models show rise time and fall times on the order of 30 ps. Furthermore, modifications of the waveguide geometry and placement of the electrodes can scale this device to speeds in excess of 20 GHz. For 10 Gbps operation, such as with 10 GbE (Gibabit Ethernet), this modulator is estimated to consume ~10 mW of electrical power with an applied voltage <1 V. This combination of modulator performance makes this device particularly suited for high speed, low loss, and low power applications such as converged I/O.

Figure 3:
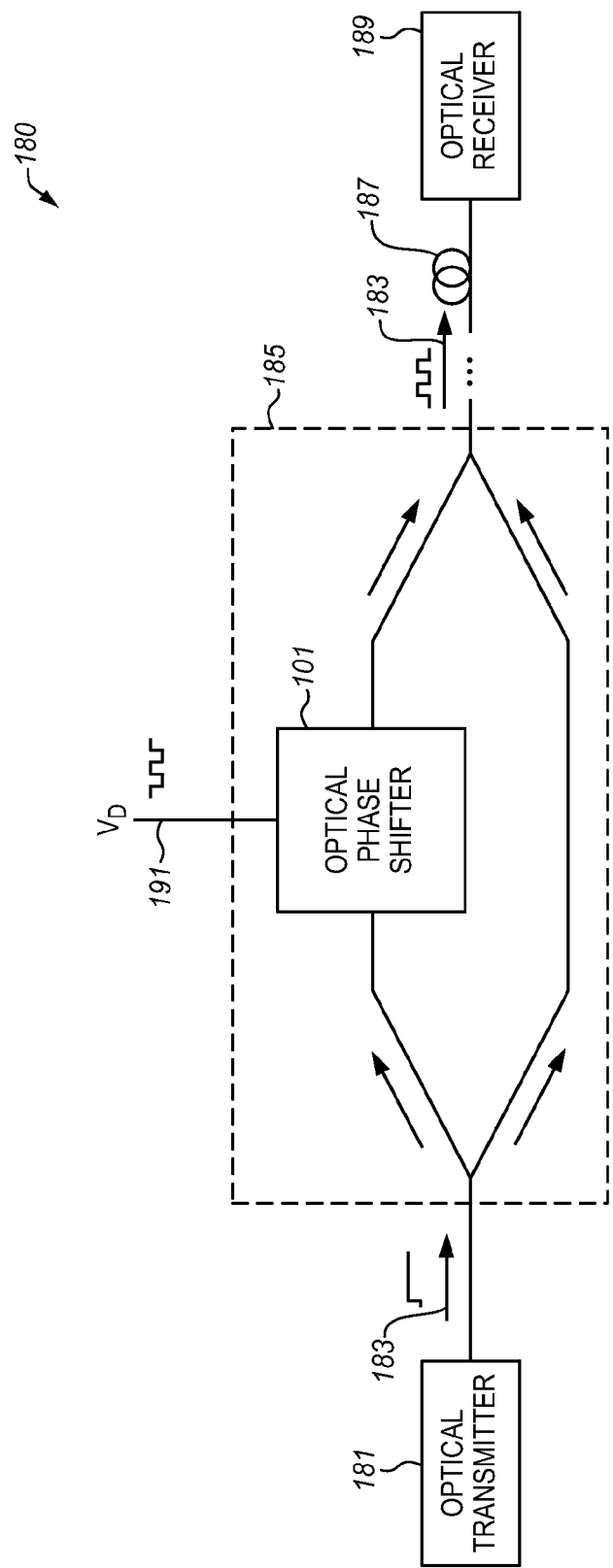
FIG. 3 is a diagram illustrating a system including an optical device having an optical phase modulator to modulate an optical beam for an embodiment in accordance with the teachings of the present invention.

FIG. 3 shows a block diagram of one embodiment of a system including an optical transmitter 181 and an optical receiver 189 with an optical device 185 including an optical phase modulator according to embodiments of the present invention. In particular, FIG. 3 shows an optical system 180 including an optical transmitter 181 and an optical receiver 189. The optical system includes an optical device 185 optically coupled between the transmitter and the receiver. The transmitter transmits an optical beam 183, for example, a continuous wave beam that is received by the optical device 185. The optical device includes a phase modulator 101, such as the phase modulator of FIG. 1 to shift the phase of the optical beam 183 in response to an external drive voltage $V_D$ 191. In the illustrated example, an optical fiber 187 is optically coupled between the optical device 185 and the optical receiver 189. The output optical waveguide includes tapers in the optical device to improve the optical coupling to the output 183.

A semiconductor-based optical amplitude modulator may be provided in a fully integrated solution on a single integrated circuit chip that includes an optical device such as the optical device 185 shown in FIG. 3. In the example of FIG. 3, the optical phase modulator 101 is included in one of the two arms of the optical device. It is optically coupled between cascaded Y-branch couplers of a Mach-Zehnder Interferometer (MZI) configuration disposed in semiconductor material. In operation, the optical beam 183 is directed into an input of the optical device, which is directed into the MZI configuration as shown. The optical beam is split so that a first portion of the optical beam is directed through one of the arms of the MZI configuration and a second portion of the optical beam is directed through the other one of the arms of the MZI configuration. As shown in the depicted embodiment, one of the arms of the MZI configuration includes the optical phase shifter or phase modulator, which adjusts a relative phase difference between the first and second portions of the optical beam in response to the external drive voltage $V_D$.

The first and second portions of the optical beam are then merged in the semiconductor substrate such that the optical beam is modulated at the output of the MZI configuration as a result of constructive or destructive interference. Ideally, the light output to the receiver is switched on and off with the changes in the drive voltage. In the described embodiment the phase modulator can respond to voltage changes quickly enough to switch the optical beam at speeds sufficient for GbE (Gigabit Ethernet), USB 3 (Universal Serial Bus, Version 3), DisplayPort and other high speed data interfaces.

In the illustrated example, only one of the arms of the MZI configuration includes an optical phase modulator. Alternatively, both of the arms of the MZI configuration may include an optical phase modulator. For instance, for one embodiment, optical phase modulators inserted into both arms of the MZI configuration are able to provide an extinction ratio of greater than 12 dB at the output using a push-pull driving scheme.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus comprising:
   an optical waveguide having a rib region and a slab region, the optical waveguide further having first and second doped semiconductor regions of opposite doping types, the first and second regions adjoining each other at a junction, the junction extending in two different directions along two peripheral sides of the waveguide in the rib region of the waveguide;
   a first higher doped semiconductor region outside an optical path of the optical waveguide, an inner portion of the first higher doped region adjoining and coupled to the first doped region of the optical waveguide, the first higher doped region having a higher doping concentration than a doping concentration within the optical path of the optical waveguide; and
   a second higher doped semiconductor region outside an optical path of the optical waveguide, an inner portion of the second higher doped region adjoining and coupled to the second doped region of the optical waveguide, the second higher doped region having a higher doping concentration than a doping concentration within the optical path of the optical waveguide.

2. The apparatus of claim 1, wherein the optical waveguide has a slab region and a rib region and wherein the junction extends across the slab region in one of the two different directions and into the rib region in the other of the two different directions.

3. The apparatus of claim 2, wherein the first doped semiconductor region substantially fills the waveguide.

4. The apparatus of claim 2 wherein the two different directions are horizontally and vertically through the waveguide, wherein horizontal is defined with respect to a surface of a substrate upon which the waveguide is formed.

5. The apparatus of claim 1, wherein the two different directions are perpendicular to each other.

6. The apparatus of claim 1, wherein the junction surrounds the periphery of the waveguide on at least two sides.

7. The apparatus of claim 1, wherein the junction extends across a top and a side of the waveguide.

8. The apparatus of claim 1, wherein the junction is Z-shaped.

9. The apparatus of claim 1, further comprising a depletion region within the waveguide at an interface between the first and second doped regions, the first and second doped regions of the waveguide having respective doping concentrations such that the depletion region is present without a drive voltage externally applied to the optical waveguide.

10. The apparatus of claim 9, wherein a size of the depletion region at the interface between the first and second regions of the optical waveguide is increased to more completely fill the waveguide in response to a drive voltage externally applied to the optical waveguide.

11. The apparatus of claim 1, further comprising a first buffer disposed along the optical waveguide and adjoining an outer portion of the first higher doped region, the first contact having an outer portion adjoining the first buffer, wherein an outer portion of the second higher doped region adjoins the first buffer, and the first contact has an outer portion adjoining the first buffer.

12. The apparatus of claim 1, further comprising:
   a first contact having an inner portion adjoining and coupled to the first higher doped region; and
   a second contact having an inner portion adjoining and coupled to the second higher doped region.

13. A method comprising:
   projecting an optical beam through an optical waveguide having a rib region and a slab region, the optical waveguide further having first and second doped semiconductor regions of opposite doping types, the first and second regions adjoining each other at a junction, the junction extending in two different directions along two peripheral sides of the waveguide in the rib region of the waveguide;
   driving the first and second doped semiconductor regions through a first higher doped semiconductor region outside an optical path of the optical waveguide, an inner portion of the first higher doped region adjoining and coupled to the first doped region of the optical waveguide, the first higher doped region having a higher doping concentration than a doping concentration within the optical path of the optical waveguide and a second higher doped semiconductor region outside an optical path of the optical waveguide, an inner portion of the second higher doped region adjoining and coupled to the second doped region of the optical waveguide, the second higher doped region having a higher doping concentration than a doping concentration within the optical path of the optical waveguide to modulate the phase of the optical beam through the waveguide.

14. The method of claim 13, wherein the optical waveguide has a region and a slab region and wherein the junction extends horizontally across the rib region in one direction and vertically in the other direction into the slab region.

15. The method of claim 14, wherein the two different directions comprise horizontally and vertically through the waveguide, wherein horizontal is defined with respect to a surface of a substrate upon which the waveguide is formed.

16. The method of claim 13 wherein driving comprises applying a drive voltage to cause a size of a depletion region to alternately more and less completely fill the waveguide at an interface between the first and second doped regions, the first and second doped regions of the waveguide having respective doping concentrations such that the depletion region is present without a drive voltage externally applied to the optical waveguide.

17. A system, comprising:
an optical transmitter to generate an optical beam;
an optical receiver optically coupled to receive the optical beam;
an optical device optically coupled between the optical transmitter and the optical receiver, the optical device including an optical phase modulator optically coupled to an optical fiber to modulate a phase of the optical beam, the optical phase modulator including:
an optical waveguide having a rib region and a slab region, the optical waveguide further having adjoining first and second doped semiconductor regions, the first and second regions having opposite doping types, the first doped region extending in two different directions along two peripheral sides of the waveguide in the rib region of the waveguide to form a carrier depletion zone through the optical waveguide;
a first higher doped semiconductor region outside an optical path of the optical waveguide, an inner portion of the first higher doped region adjoining and coupled to the first doped region of the optical waveguide, the first higher doped region having a higher doping concentration than a doping concentration within the optical path of the optical waveguide;
a second higher doped semiconductor region outside an optical path of the optical waveguide, an inner portion of the second higher doped region adjoining and coupled to the second doped region of the optical waveguide, the second higher doped region having a higher doping concentration than a doping concentration within the optical path of the optical waveguide.

18. The system of claim 17, wherein a size of the depletion region is adjusted in response to an external drive voltage applied to the first and second doped regions.

* * * * *

UNITED STATES PATENT AND TRADEMARK OFFICE
CERTIFICATE OF CORRECTION

| | | |
|---|---|---|
| PATENT NO. | : 7,747,122 B2 | Page 1 of 1 |
| APPLICATION NO. | : 12/242454 | |
| DATED | : June 29, 2010 | |
| INVENTOR(S) | : Shetrit et al. | |

It is certified that error appears in the above-identified patent and that said Letters Patent is hereby corrected as shown below:

Specification

Please insert in column 1, line 5 before BACKGROUND:

--STATEMENT OF GOVERNMENT INTEREST

This invention was made with Government support under contract number H98230-08-3-0011 awarded by the Department of Defense. The Government has certain rights in this invention.--

Signed and Sealed this
First Day of December, 2015

Michelle K. Lee
*Director of the United States Patent and Trademark Office*